United States Patent
Blaise et al.

(10) Patent No.: US 9,421,402 B2
(45) Date of Patent: Aug. 23, 2016

(54) FALL DETECTION DEVICE FOR LIFELINE; LIFELINE INSTALLATION EQUIPPED WITH SAID DEVICE; ASSOCIATED FALL DETECTION METHOD

(71) Applicant: TOTAL MARKETING SERVICES, Puteaux (FR)

(72) Inventors: Jean-Hugues Blaise, Theux (BE); Arnaud Plaideau, Court Saint Etienne (BE)

(73) Assignee: Total Marketing Services, Puteaux (FR)

( * ) Notice: Subject to any disclaimer, the term of this patent is extended or adjusted under 35 U.S.C. 154(b) by 0 days.

(21) Appl. No.: 14/325,722

(22) Filed: Jul. 8, 2014

(65) Prior Publication Data

US 2015/0014092 A1 Jan. 15, 2015

(30) Foreign Application Priority Data

Jul. 9, 2013 (FR) ...................................... 13 56739

(51) Int. Cl.
*A62B 35/00* (2006.01)
*A62B 35/04* (2006.01)
*G01L 5/04* (2006.01)

(52) U.S. Cl.
CPC ......... *A62B 35/0043* (2013.01); *A62B 35/0068* (2013.01); *A62B 35/0081* (2013.01); *A62B 35/04* (2013.01); *G01L 5/04* (2013.01)

(58) Field of Classification Search
CPC . A62B 35/0068; A62B 35/0081; A62B 35/04
See application file for complete search history.

(56) References Cited

U.S. PATENT DOCUMENTS

| 5,332,071 A | * | 7/1994 | Duncan | 188/371 |
| 5,368,123 A | * | 11/1994 | Castellana | 180/283 |
| 2011/0090079 A1 | * | 4/2011 | Morino et al. | 340/532 |
| 2011/0103558 A1 | | 5/2011 | Hooten | |

FOREIGN PATENT DOCUMENTS

| CA | 2417592 A1 | * | 7/2004 |
| EP | 1466650 A1 | | 10/2004 |
| FR | 2755236 A1 | | 4/1998 |
| WO | WO 9408658 A1 | * | 4/1994 |
| WO | WO-9951304 A2 | | 10/1999 |

* cited by examiner

*Primary Examiner* — Alvin Chin-Shue
(74) *Attorney, Agent, or Firm* — Harness, Dickey & Pierce, P.L.C.

(57) ABSTRACT

A fall detection device for a lifeline, intended to be mounted on an energy absorber which includes a static portion and a mobile portion secured together, wherein the mobile portion is shifted in the event of a force higher than a force threshold value and actuates an absorber. The fall detection device includes a sensor and trajectory tracking device secured to the end of the static portion or to the end of the mobile portion and able freely to move with the end of the mobile portion or the end of the static portion respectively. This trajectory tracking device is adapted to actuate the sensor when shifting of the mobile portion is data-generating.

3 Claims, 3 Drawing Sheets

FALL DETECTION DEVICE FOR LIFELINE; LIFELINE INSTALLATION EQUIPPED WITH SAID DEVICE; ASSOCIATED FALL DETECTION METHOD

CROSS-REFERENCE TO RELATED APPLICATIONS

This application claims the benefit and priority of French Patent Application Serial No. 1356739, filed on Jul. 9, 2013, which is incorporated by reference herein.

TECHNICAL FIELD

The present invention relates to a fall detection device for a lifeline, it also concerns a lifeline installation comprising said device; it further relates to an associated fall detection method using said fall detection device for a lifeline. The field of the invention is Personal Protection Equipment (PPE) against falls from a height, such as the equipment used for example by industrial workers operating on elevated platforms or in the building sector where workers have to move on high scaffolding, formwork or roofing during construction work, when renovating or maintaining buildings. Other technical sectors also use this type of equipment. In the field of PPE against falls from a height there is also a category of equipment called anchoring devices which allow a user wearing equipment of safety harness and lanyard type to be connected to an anchor structure such as an industrial building structure, part of a building, a pylon. An operator can therefore be protected in the event of a fall when working at height for example when working on a component part of an industrial system, when servicing, cleaning or renovating.

In particular a lifeline is a safety installation arranged on an anchor structure in general permanently, formed of at least one cable and two anchor points on the anchor structure. The anchor points may be formed by hooking devices arranged on the structure, by struts added onto the structure or by any other means able to ensure securing of the cable to the said anchor structure. The cable is most often in steel. A karabiner or equivalent means is connected by a lanyard or strap to a harness worn by the operator.

BACKGROUND

During a fall from a height a peak force is induced within the cable of the lifeline, this force being defined as the maximum instant force developed in the direction of the cable under the effect of the impact applied at the time of fall arrest. To attenuate the size of this peak force it is known to equip the lifeline with an energy absorbing device to limit stresses transmitted to the anchor structure and to cushion the effect of the fall for the operator. A usual energy absorber comprises a static portion and a mobile portion secured together wherein the mobile portion is shifted in relation to the static portion in the event of a force higher than a force threshold value and actuates absorbing means. To prevent the absorbing means from coming into action under conditions of normal use, threshold triggering means are provided so that the absorbing means come into action on and after a force threshold value estimated and/or calibrated to correspond to the fall of an operator.

The static portion and the mobile portion each comprise fastening means arranged at one of their ends. The end of the mobile portion is connected to the cable of the lifeline on which a karabiner or equivalent means is attached connecting with the harness worn by the operator via a lanyard or strap. The cable of the lifeline is connected to an anchor point of the anchor structure. The end of the static portion is connected either directly or via another cable to another anchor point of the anchor structure. By "static portion" is meant a portion which, unlike the "mobile portion" does not move significantly in relation to the anchor points when the absorbing means are actuated.

Known energy absorbers have absorbing means which have recourse to compression or traction of elastic components, springs in particular. Other known energy absorbers have recourse to deformation e.g. plastic and/or rupture of materials when compressive or tensile demand is placed thereupon. Such absorbers are most often of single-use type.

The lifelines equipped with said energy absorbers are satisfactory to limit the consequences of a fall and to retain the operator. However, they do not allow transmission of data allowing detection that a fall has occurred. It is the objective of the present invention to obviate this disadvantage.

SUMMARY

For this purpose the present invention proposes a fall detection device for a lifeline, intended to be mounted on an energy absorber, the energy absorber comprising a static portion and a mobile portion secured together wherein the mobile portion is shifted in relation to the static portion in the event of a force higher than a force threshold value and actuates absorbing means, wherein the static portion and the mobile portion each comprise fastening means arranged at one of the their ends, wherein the end of the mobile portion is intended to be connected to a cable of a lifeline connected onto an anchor point of an anchor structure, and the end of the static portion is connected to another anchor point of the anchor structure, wherein the fall detection device comprises a sensor and a trajectory tracking device secured to the end of the static portion or to the end of the mobile portion and able to move freely with the end of the mobile portion of the end of the static portion respectively, the trajectory tracking device being adapted to actuate the sensor when the mobile portion is shifted in such manner to generate data on the shifting of the mobile portion relative to the static portion. The fall detection device mounted on an energy absorber of a lifeline advantageously allows the detection of a fall of an operator and the sending of an appropriate signal allowing the consequences to be addressed and in particular measures to be taken to send rescue to the fallen person. It is also noted that the device is intended to be mounted on an energy absorber and on this account is able to be compact and to integrate perfectly with the other components of the lifeline.

As mentioned previously, and as is fully usual, the energy absorber does not come into action under normal conditions of use and comprises threshold triggering means provided to allow the actuating of the mobile portion relative to the static portion on and after a threshold force value estimated and/or calibrated as corresponding to the fall of an operator. Energy absorbers for lifelines are commonly marketed with information on the threshold force values. Also, this threshold value has no influence on the functioning of the present fall detection device since it comprises means for tracking the trajectory of the mobile portion relative to the static portion i.e. it is actuated after the threshold value has been reached.

In the present invention by "cable" is meant any bundle of fibres, braided in particular, extending in a longitudinal direction. A cable is generally formed of a plurality of assembled strands. The strands may be natural or synthetic textile strands. The strands may be of organic or metal type. According to one embodiment the cable comprises metal fibres, in steel in particular.

In the present invention by "trajectory tracking device" is meant any device able to measure a variation in distance between two points. As examples a trajectory tracking device may have measuring means using a mechanical device and/or electric device and/or optical device. In the present invention by "anchor structure" is meant any construction or installation, industrial in particular, on which it is desired to carry out above-ground operations and to ensure the safety of operators by installing a lifeline between two points of the structure. It is to be noted that a lifeline is in general horizontal but it may also be arranged at an angle to the horizontal.

According to one embodiment, the lifeline of the present invention is arranged on an industrial installation in which chemical fluids are handled. For example, it may be a structure supporting tanks of liquid or gaseous chemical products, provided with above-ground orifices allowing content to be drawn from the tanks. The present invention finds particular application when an operator must ensure the loading of a tanker vehicle parked underneath or next to these tanks.

Different embodiments of the fall detection device for a lifeline can be combined together in any technically possible combination:

the trajectory tracking device is formed of a rigid sliding rod secured to the end of the static portion or to the end of the mobile portion, and has a housing respectively secured to the end of the mobile portion or the end of the static portion, wherein the sliding rod slides within the housing;
  the fall detection device comprises a rigid arm secured to the end of the static portion or a rigid arm secured to the end of the mobile portion, wherein the trajectory tracking device is secured to the arm; according to one embodiment this fall detection device comprises a rigid arm secured to the end of the mobile portion and a rigid arm secured to the end of the static portion wherein each arm extends longitudinally and is arranged along one same longitudinal axis, and wherein the trajectory tracking device is either slidably secured with the arm secured to the end of the mobile portion or slidably secured with the arm secured to the end of the static portion;
  the sensor is a shift sensor;
  the shift sensor comprises a rigid or mobile follower rod whose movement generates data and wherein the trajectory tracking device comprises geometric characteristics adapted to cooperate with the follower rod so that this rod is caused to move when the mobile portion of an energy absorber is shifted in relation to its static portion;
  a notch is formed in the sliding rod and either the follower rod is arranged at rest in the notch and can move out of this notch when the mobile portion of an energy absorber is shifted in relation to its static portion, or the follower rod is arranged so as to enter inside the said notch when the mobile portion of an energy absorber is shifted in relation to its static portion.

The present invention also concerns a lifeline installation arranged on an anchor structure comprising a lifeline cable anchored at one end onto the anchor structure and onto an energy absorber at the other end, wherein the energy absorber comprises a static portion and a mobile portion secured together, the mobile portion being shifted in relation to the static portion in the event of a force higher than a force threshold value and actuating absorbing means, the static portion and the mobile portion each comprising fastening means arranged at one of their ends, the end of the mobile portion being connected onto the lifeline cable and the end of the static portion being connected onto another anchor point of the anchor structure, and wherein the lifeline installation also comprises an aforementioned fall detection device comprising a sensor these being arranged to cooperate with the energy absorber so as to generate data when the mobile portion of the energy absorber is shifted.

According to different embodiments of the lifeline installation which may be combined together in all technically possible embodiments:

the static portion and the mobile portion of the absorbing means extend longitudinally along one same axis;
  the fall detection device comprises a rigid arm secured to the end of the mobile portion, and a rigid arm secured to the end of the static portion, wherein each arm extends longitudinally and is arranged along one same longitudinal axis, and wherein the trajectory tracking device is either slidably connected with the arm secured to the end of the mobile portion, or slidably connected with the arm secured to the end of the static portion, and wherein the axis along which there extend the static portion and mobile portion of the absorbing means merges with the axis along which there extend the rigid arm secured to the end of the mobile portion and the rigid arm secured to the end of the static portion.

The present invention also concerns a fall detection method using the aforementioned lifeline installation, wherein the data on shifting of the mobile portion of the energy absorber is transmitted to a control centre. According to one embodiment the transmitted data generate additional steps of triggering alerts and/or rescue action.

BRIEF DESCRIPTION OF THE FIGURES

In the different Figures, similar elements carry identical references. In addition, the different elements are not necessarily drawn to scale to provide a view facilitating comprehension of the invention.

DETAILED DESCRIPTION

Figure 1:
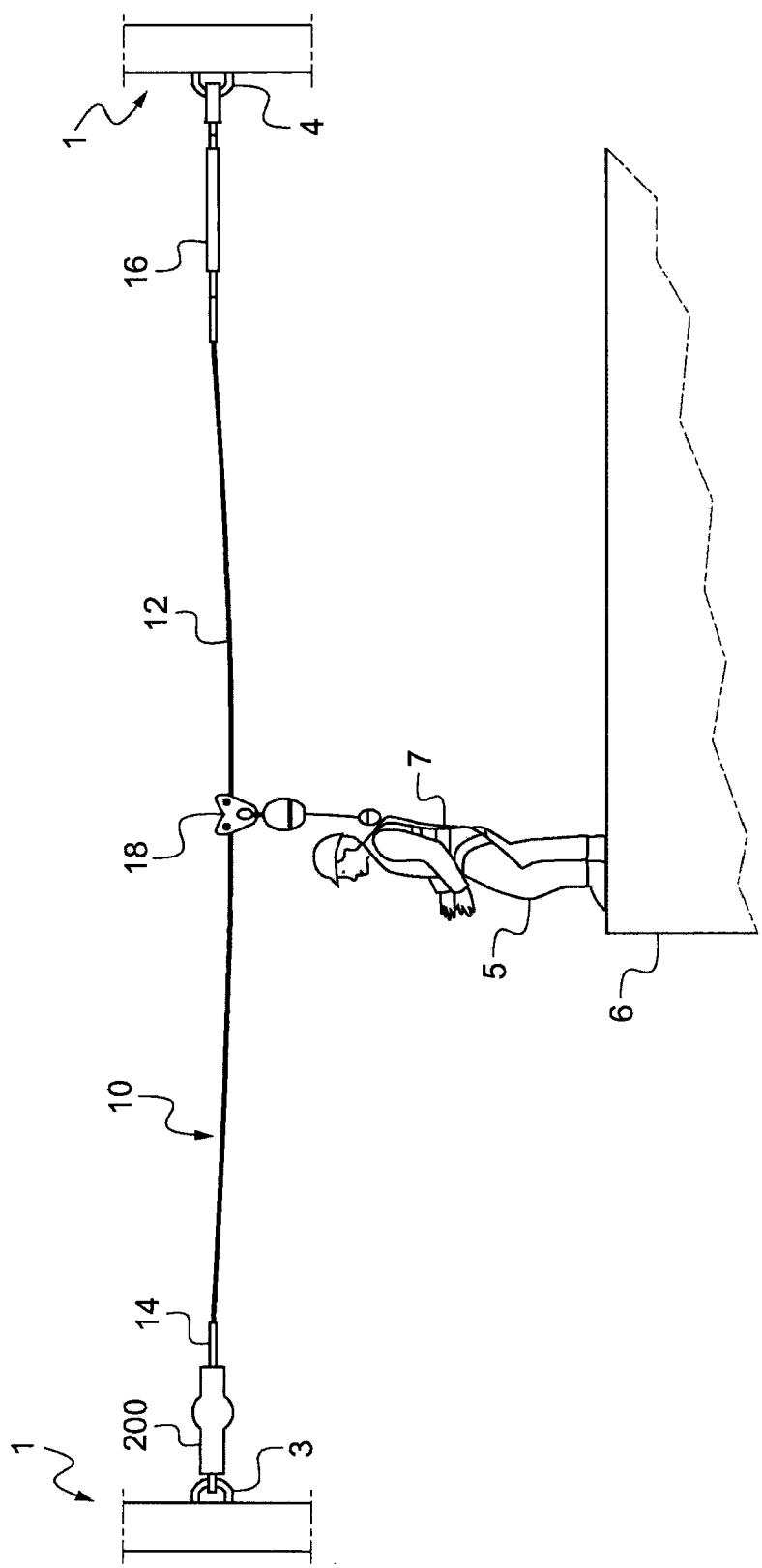
FIG. 1 illustrates a lifeline installation arranged on an anchor structure.

FIG. 1 illustrates a lifeline installation 10 arranged on an anchor structure 1. The anchor structure may be a structure of an industrial installation for example or part of a building. It is also possible to use the lifeline and fall detection device of the present invention in numerous other fields, for example for open air activities. In the illustrated example the lifeline is arranged horizontally; a lifeline and fall detection device of the present invention may also be used to follow an inclined even vertical trajectory. In the illustrated example the lifeline installation allows an operator 5 to move on a platform 6 located at height, where movement may lead to risk of a fall. As is conventional, the lifeline installation comprises a cable 12 whose ends are connected onto cable tension adjusting devices 14, 16 known to persons skilled in the art of personal protection equipment; the cable may be in steel for example; nevertheless it may be formed of any assembly of strands whose structure or type are adapted to withstand forces arising from the fall of an operator. It is also possible to use lines or ropes formed of various strands. The cable tension adjusting device 14 is also connected to an energy absorber 200 also known per se; as is usual the cable tension adjusting device 16 is also connected to an anchor point 4 of the anchor structure; the energy absorber 200 is connected onto an anchor point 3 of the anchor structure. An anchor point of the anchor structure may be a ring for example cemented into the anchor structure onto which an element is connected e.g. via a ring, karabiner or any other adapted connecting means. The operator 5 wears a harness 7 which via a lanyard, strap or fall arrest is connected with a pulley 18 sliding on the lifeline cable 12. An operator is therefore able to move easily around the platform 6 without hindrance of movement. Numerous operations can therefore be carried out, in particular handling of loads, installation-related operations e.g. chemical installation, construction or repair work. Should the operator 5 fall, a peak force is produced in the lifeline cable which causes actuation of the energy absorbing device to damp the effect of the operator's fall.

In one example of the invention, the anchor structure is a chemical installation comprising a plurality of fixed tanks containing liquid and/or gaseous chemical fluids; the operator's mission in particular is to fill the reservoir of a tanker vehicle designed to transport chemical products. The operator works from a platform located above the tanker vehicle and has to take hold of a dispensing hose of which one end is connected to the fixed tank and the other end is inserted in an opening of the tanker generally arranged on the top side of the tanker's reservoir. In one embodiment, the operator is also the driver of the said tanker. It is frequent that in chemical product installations where contents are to be drawn from a plurality of tanks, a single operator is in charge of all the tasks related to the filling of a tanker's reservoir and operating of the tanker; this operator may work in isolation and it is prudent to provide means to inform an installation or safety device of an anomaly, in particular of a fall of an operator. It is also possible to gather other information, for example by means of surveillance cameras. In the event of a serious alert, action can be decided upon and third parties sent to rescue the operator.

Figure 2:
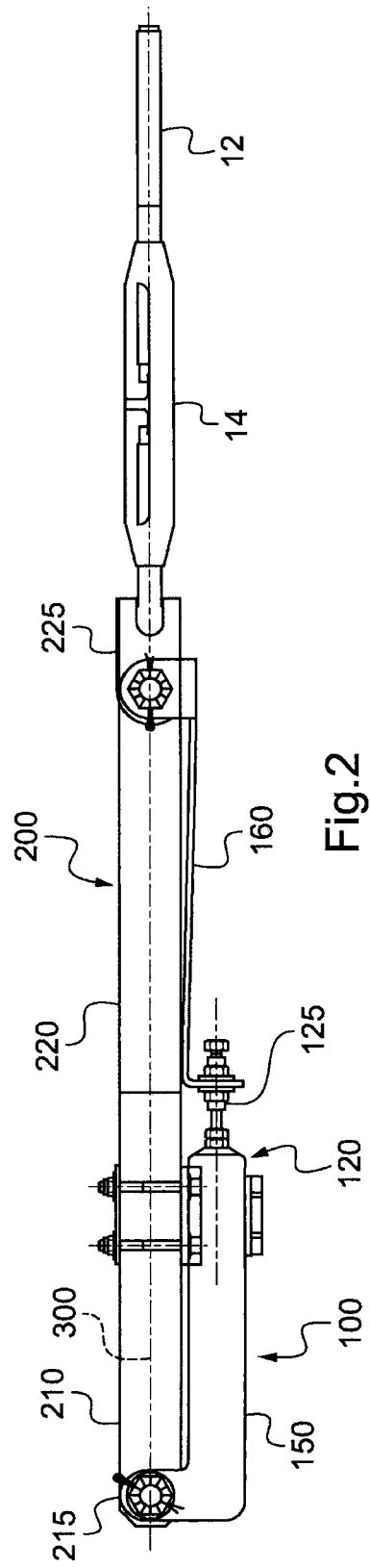
FIGS. 2 to 5 illustrate an energy absorber on which there is mounted a fall detection device of the present invention, these intended to be mounted on a lifeline.
Figure 3:
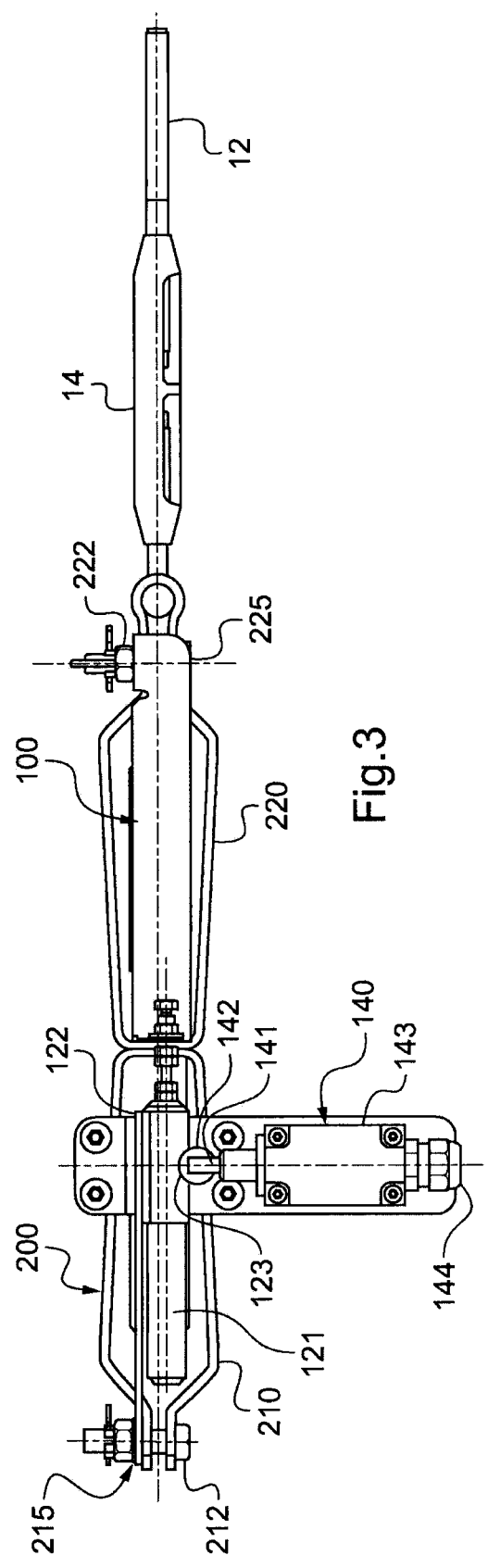
Figure 5:
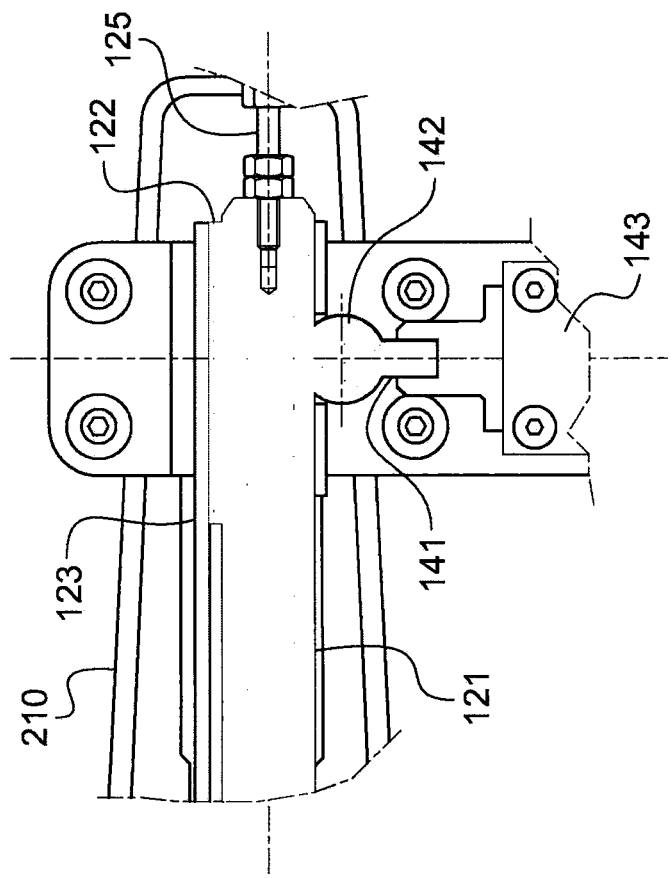
Figure 4:
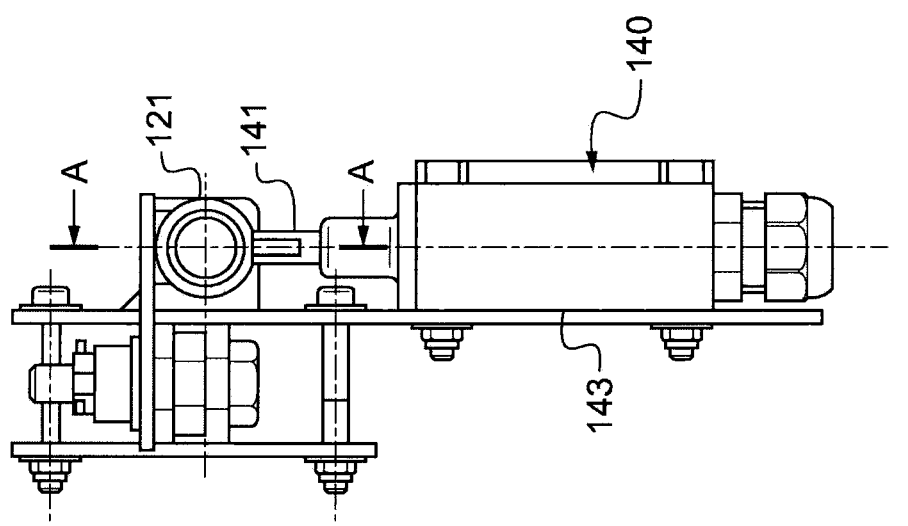

FIGS. 2 to 5 illustrate an energy absorber 200 on which there is mounted a fall detection device 100, these intended to be mounted on a lifeline. FIG. 2 is a front view; FIG. 3 is an overhead view; FIG. 4 is a side view; FIG. 5 is a cross-sectional view along A-A.

The illustrated energy absorber 200 is marketed by "LATCHWAYS Fall protection" under reference ManSafe®—Super 12 Xtenda C/W Line Tenser. The energy absorber 200 comprises a static portion 210 and a mobile portion 220 secured to one another. The mobile portion is shifted in relation to the static portion in the event of a force higher than a force threshold value, and actuates absorbing means. As mentioned previously, the threshold value is determined by the installer or designer of the lifeline so that triggering of the separation of the two parts takes place when a fall occurs. The length of energy absorber 200 is about 400 mm in the initial state i.e. compressed, and about 450 mm after deployment when the absorbing means have been actuated. The static portion and the mobile portion each comprise fastening means 212, 222 respectively arranged at one of their ends, 215, 225 respectively. These means 212, 222 are formed of screws, bolts, keys. They allow the energy absorber 200 to be connected to other components. The energy absorber 200 extends longitudinally along an axis 300. In the illustrated absorber the two ends 215, 225 are arranged opposite one another either side of the absorber. The end of the mobile portion, 225 is connected by fastening means 222 to an end of the lifeline cable 12 via a cable tension adjusting device 14. The lifeline cable 12 is connected at its other end to the anchor point 4 of the anchor structure. The end of the static portion 215 is connected by fastening means 212 to the other anchor point 3 of the anchor structure via any suitable means.

The fall detection device 100 according to the present invention is mounted on the energy absorber 200 so as to generate data on shifting of the mobile portion 220 of the energy absorber 200 in relation to its static portion 210. The fall detection device 100 comprises a sensor 140 and a trajectory tracking device 120 secured to the end of the static portion 215 and free to move with the end of the mobile portion 225. The trajectory tracking device actuates the sensor 140 on shifting of the mobile portion 220.

The device 120 comprises a rigid sliding rod 121 secured to the end of the mobile portion and a housing 122 secured to the static portion 210. The housing 122 is secured to the end of the static portion via an intermediate part.

The sliding rod 121 slides freely inside the housing 122. The housing 122 is a hollow cylinder. The length of the sliding rod 121 is of the same order of magnitude as the length of the static portion. The sliding rod 121 comprises a main portion whose diameter is slightly smaller than the inner diameter of the hollow cylinder forming the housing, and an end portion formed of a threaded part screwed first into a threaded opening of the main part and secondly to a part maintained to the end of the mobile portion 225 being retained by nuts 125.

In this embodiment, the fall detection device comprises a rigid arm 150 secured to end 215 of the static portion and a rigid arm secured to end 225 of the static portion. Each of the arms extends longitudinally and is arranged along the longitudinal axis 300. The rigid arms 150 and 160 are obtained by cutting and folding steel sheet. The rigid arm 150 is L-shaped whose main part is arranged along axis 300 and the return is arranged perpendicularly; the return of the L of the rigid arm 150 comprises an opening through which the body of the screw passes belonging to the fastening means 212, thereby forming an intermediate securing part. The housing 122 is welded to the main part of the L of the rigid arm 150; the housing 122 is thereby secured to the end of the static portion 210.

The rigid arm 160 is double L-shaped whose main part is arranged along axis 300 and the returns are perpendicular; the first return of the double L of the rigid arm 160 comprises an opening through which the body of the screw passes belonging to fastening means 222, thereby forming an intermediate securing part. The other return of the double L of the rigid arm 160 has a hole and is arranged to receive the thread rod of the sliding rod 121; nuts 125 secure the threaded rod to this return of the double L, and hence to the end of the mobile portion 225.

The sensor 140 is a shift sensor marketed by BARTEC under the trade reference 07-2911-1 3 30/20. It comprises a rigid, mobile follower rod 141; at its end part the follower rod 141 comprises a rolling disc 142 which is arranged so as to follow a profile of the surface of the sliding rod 121. The rod 141 actuates a device adapted to generate an electric signal when it is moved inside the body 143 of the sensor. An electric lead passing through the orifice 144 transmits the signal to a signal processing device to record and process the signal.

The sensor 140 and in particular the rod 141 are arranged perpendicular to the axis 300. The sensor 140 is attached on the fixed part 210 via two plates arranged either side of the fixed part and screwed together; one of the plates is welded to the rigid arm 150.

The surface profile of the sliding rod 121 with which the rolling disc 142 is in contact comprises a notch 123. The disc of the follower rod 141 when at rest is arranged in this notch i.e. when the energy absorber is compressed in its initial state;

when it is deployed after actuation of the absorbing means, the follower rod 141 moves out of this notch and the associated change of movement is detected by the sensor 140 which converts this change to signal form.

The constituents of the fall detection device 100 are advantageously designed to be mounted on the energy absorber 200 in compact manner, easy to mount and dismount. A fall detection device and method are therefore provided wherein data on shifting of the mobile portion of the energy absorber is transmitted to a control centre. The transmitted data may generate additional steps to trigger alerts and/or rescue action. It is then possible to send rapid assistance to an operator who has suffered a fall. The present invention is evidently not limited to the examples and embodiments described and illustrated herein, but may undergo numerous variants within the reach of persons skilled in the art.

The invention claimed is:

1. A fall detection device for a lifeline, intended to be mounted on an energy absorber, the energy absorber comprising a static portion and a mobile portion secured together, wherein the mobile portion is shifted relative to the static portion in the event of a force higher than a force threshold value and actuates an absorber, wherein the static portion and the mobile portion each comprise a fastener arranged at one of their ends, wherein the end of the mobile portion is intended to be connected to a lifeline cable connected onto an anchor point of an anchor structure and the end of the static portion is connected onto another anchor point of the anchor structure, the fall detection device comprises a shift sensor and a trajectory tracking device secured to the end of the static portion or to the end of the mobile portion and can freely move with the end of the mobile portion or with the end of the static portion respectively, the trajectory tracking device being adapted to actuate the sensor when the mobile portion is shifted in a manner generating data on shifting of the mobile portion relative to the static portion, wherein the trajectory tracking device is a rigid sliding rod secured to the end of the static portion or to the end of the mobile portion and has a housing respectively secured to the end of the mobile portion or to the end of the static portion, and wherein the sliding rod slides inside the housing, wherein the shift sensor comprises a rigid, mobile follower rod whose movement generates data and wherein the trajectory tracking device has geometric characteristics adapted to cooperate with the follower rod to cause movement thereof when the mobile portion of an energy absorber is shifted relative to its static portion, wherein a notch is made in the sliding rod and wherein either the follower rod is arranged at rest in the notch and can move out of the notch when the mobile portion of an energy absorber is shifted relative to its static portion, of the follower rod is arranged so as to enter the notch when the mobile portion of an energy absorber is shifted relative to its static portion.

2. The fall detection device according to claim 1 comprising a first rigid arm secured to the end of the static portion or a second rigid arm secured to the end of the mobile portion and wherein the trajectory tracking device is secured to the first arm.

3. The fall detection device according to claim 2 comprising the second rigid arm secured to the end of the mobile portion and the first rigid arm secured to the end of the static portion, wherein each of the first and second arms extends longitudinally and is arranged along one same longitudinal axis, and wherein the trajectory tracking device is either in sliding connection with the second arm secured to the end of the mobile portion, or in sliding connection with the first arm secured to the end of the static portion.

* * * * *